(12) United States Patent
Bernstein

(10) Patent No.: US 9,625,327 B1
(45) Date of Patent: *Apr. 18, 2017

(54) DEVICE AND METHOD FOR LOGGING DATA FROM AN INSPECTION PROBE TO A COMPUTING DEVICE

(71) Applicant: e-Control Systems, Inc., Sherman Oaks, CA (US)

(72) Inventor: Eran Y. Bernstein, Sherman Oaks, CA (US)

(73) Assignee: E-CONTROLSYSTEMS, INC., Sherman Oaks, CA (US)

( * ) Notice: Subject to any disclaimer, the term of this patent is extended or adjusted under 35 U.S.C. 154(b) by 686 days.

This patent is subject to a terminal disclaimer.

(21) Appl. No.: 14/051,384

(22) Filed: Oct. 10, 2013

Related U.S. Application Data

(60) Provisional application No. 61/726,032, filed on Nov. 14, 2012.

(51) Int. Cl.
*G01K 13/00* (2006.01)

(52) U.S. Cl.
CPC .................... *G01K 13/00* (2013.01)

(58) Field of Classification Search
USPC ......................................................... 702/130
See application file for complete search history.

(56) References Cited

U.S. PATENT DOCUMENTS

| | | | |
|---|---|---|---|
| 7,075,442 B2 | 7/2006 | Lion et al. | |
| 7,201,099 B2 | 4/2007 | Harris, Jr. et al. | |
| 7,512,154 B2 | 3/2009 | Quigley et al. | |
| 7,519,082 B2 | 4/2009 | Quigley et al. | |
| 7,846,397 B2 | 12/2010 | Gregg et al. | |
| 7,929,568 B2 | 4/2011 | Ram et al. | |
| 8,311,040 B2 | 11/2012 | Stanwood et al. | |
| 9,064,389 B1 * | 6/2015 | Bernstein | G08C 17/02 |
| 2006/0220887 A1 | 10/2006 | Lion et al. | |
| 2006/0232287 A1 | 10/2006 | Stemer et al. | |
| 2008/0043809 A1 | 2/2008 | Herbert | |
| 2010/0040191 A1 | 2/2010 | Ubarretxena Belandia et al. | |
| 2010/0158015 A1 | 6/2010 | Wu | |

OTHER PUBLICATIONS

Temperature Measurement, Jun. 27, 2006, 49 pages.*

* cited by examiner

*Primary Examiner* — Tung Lau
(74) *Attorney, Agent, or Firm* — Patterson Intellectual Property Law, P.C.; Mark J. Patterson

(57) ABSTRACT

An electronic inspection apparatus includes a probe, a sensor, a memory unit, and a controller. The apparatus senses a condition, and stores data representative of the sensed condition at a high bit rate. The inspection apparatus transfers the sensed data to a computing device or database via a lower bit rate. In one embodiment, a data queue or memory unit of a temperature probe temporarily stores data before transmitting the data to a computing device (e.g., a mobile device). The method of the present invention provides two separate data logging parameters: (1) how fast to read and log data which determines a data logging period and (2) how fast to send the data to the mobile device which determines a data transmit period. Thus, the data transfer period is isolated or decoupled from the data logging period.

6 Claims, 2 Drawing Sheets

DEVICE AND METHOD FOR LOGGING DATA FROM AN INSPECTION PROBE TO A COMPUTING DEVICE

CROSS-REFERENCES TO RELATED APPLICATIONS

This application claims priority to and hereby incorporates by reference in its entirety U.S. Provisional Patent Application No. 61/726,032 entitled "DEVICE AND METHOD FOR LOGGING DATA FROM AN INSPECTION PROBE TO A MOBILE DEVICE" filed Nov. 14, 2012.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention generally relates to automated inspection systems. More particularly, the present invention pertains to methods and devices for logging data from inspection probes to computing devices, especially mobile computing devices.

Inspection probe manufacturers supply inspection probes that can be connected to computing devices (e.g., mobile devices such as cellular phones and tablet computers) and send data at set periodic intervals. These periodic intervals can be one-half second or longer. This method of data logging presents a significant obstacle to those users and inspection systems that need to log data at faster rates, or when connecting to computing devices that are constrained by processing power. Frequently, the data rate from the inspection probe exceeds the available bandwidth of the link between the probe and the computing device or between a computing device with limited memory unit and a database receiving the data from the computing device and storing the received data. In conventional data logging, the only parameter needed is how fast to read and log the data.

What is needed, then, is a device and method for overcoming data logging shortcomings and obtaining faster logging times for inspection data acquisition devices (e.g., probes) connected to slow computing devices (e.g., mobile or peripheral communication devices).

BRIEF SUMMARY OF THE INVENTION

Aspects of the present invention provide an electronic inspection apparatus including a probe, a sensor, a memory unit, and a controller. The apparatus senses a condition, and stores data representative of the sensed condition at a high bit rate. The apparatus then transfers the sensed data to a computing device or database via a slower bit rate connection. In one embodiment, a data queue or memory unit of a temperature probe temporarily stores and aggregates data before transmitting the data to a computing device (e.g., a mobile device). The method of the present invention provides two separate data logging parameters: (1) how fast to read and log data (i.e., logging period) and (2) how fast to send the data to the mobile device (i.e., transmit period). Thus, the data transfer period is isolated or de-coupled from the logging period.

In one aspect, an electronic inspection apparatus includes a portable inspection probe, a data sensor, a memory unit, and a controller. The data sensor is functionally coupled to the inspection probe and is operable to sense a condition of an environment proximate probe and provide a data signal indicative of the sensed environmental condition proximate to the inspection probe. The memory unit receives and stores data. The controller receives the provided data signal from the data sensor, provides data to the memory unit as a function of the received data signal, retrieves the provided data from the memory unit, and provides the retrieved data to a computing device.

In another aspect, an apparatus operable to determine an environmental condition includes a computing device and an electronic inspection apparatus. The computing device includes computer readable storage media having computer executable instructions effective to receive data and determine the environmental condition as a function of the received data. The electronic inspection apparatus includes an inspection probe, a data sensor, a memory unit, and a controller. The data sensor is functionally coupled to the probe and is operable to sense a condition of an environment proximate the probe. The data sensor provides a data signal indicative of the system environmental condition proximate to the inspection probe. The memory unit receives and stores data. The controller receives the provided data signal from the data sensor, provides data to the memory unit as a function of the received data signal, retrieves the provided data from the memory unit, and provides the retrieved data to the computing device, wherein the computing device uses the provided data to determine the environmental condition.

In another aspect, a method of determining a temperature of food includes placing a probe of an electronic temperature probe in proximity to food. A temperature sensor of the electronic temperature probe provides a temperature signal indicative of a sensed temperature. A memory unit receives temperature data from the electronic temperature probe. The memory unit stores the received temperature data. A controller of the electronic temperature probe receives the provided temperature signal from the temperature sensor. The controller provides the temperature data to the memory unit. The controller retrieves the temperature data from the memory unit, and provides the retrieved temperature data to a computing device. The computing device receives the temperature data and determines, via computer executable instructions stored in a computer readable media of the computing device, the temperature of the food as a function of the temperature data received by the computing device.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

While the making and using of various embodiments of the present invention are discussed in detail below, it should be appreciated present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

Figure 1:
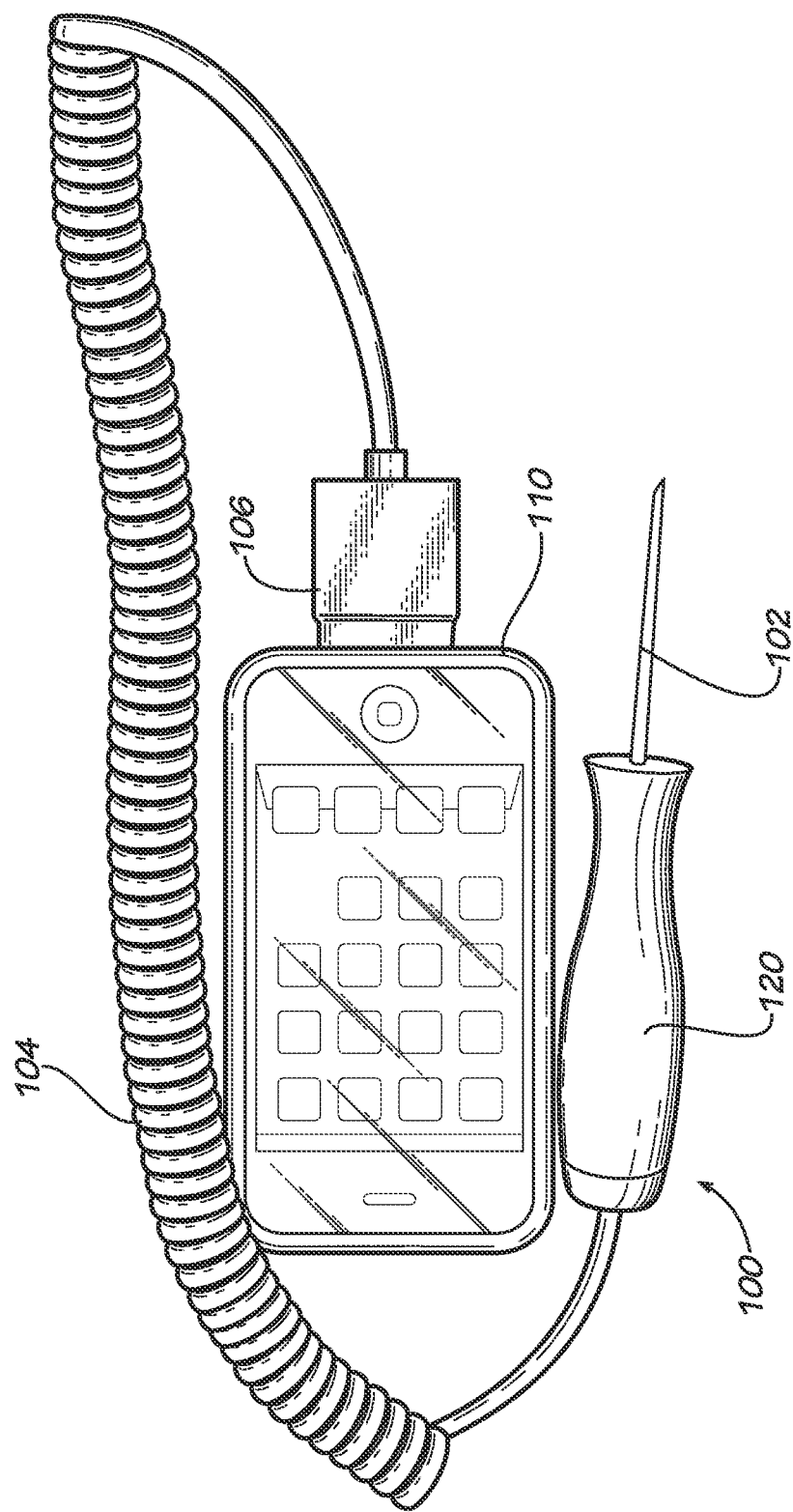
FIG. 1 is a top perspective view of an apparatus operable to determine a temperature including a computing device and an electronic inspection apparatus.
Figure 2:
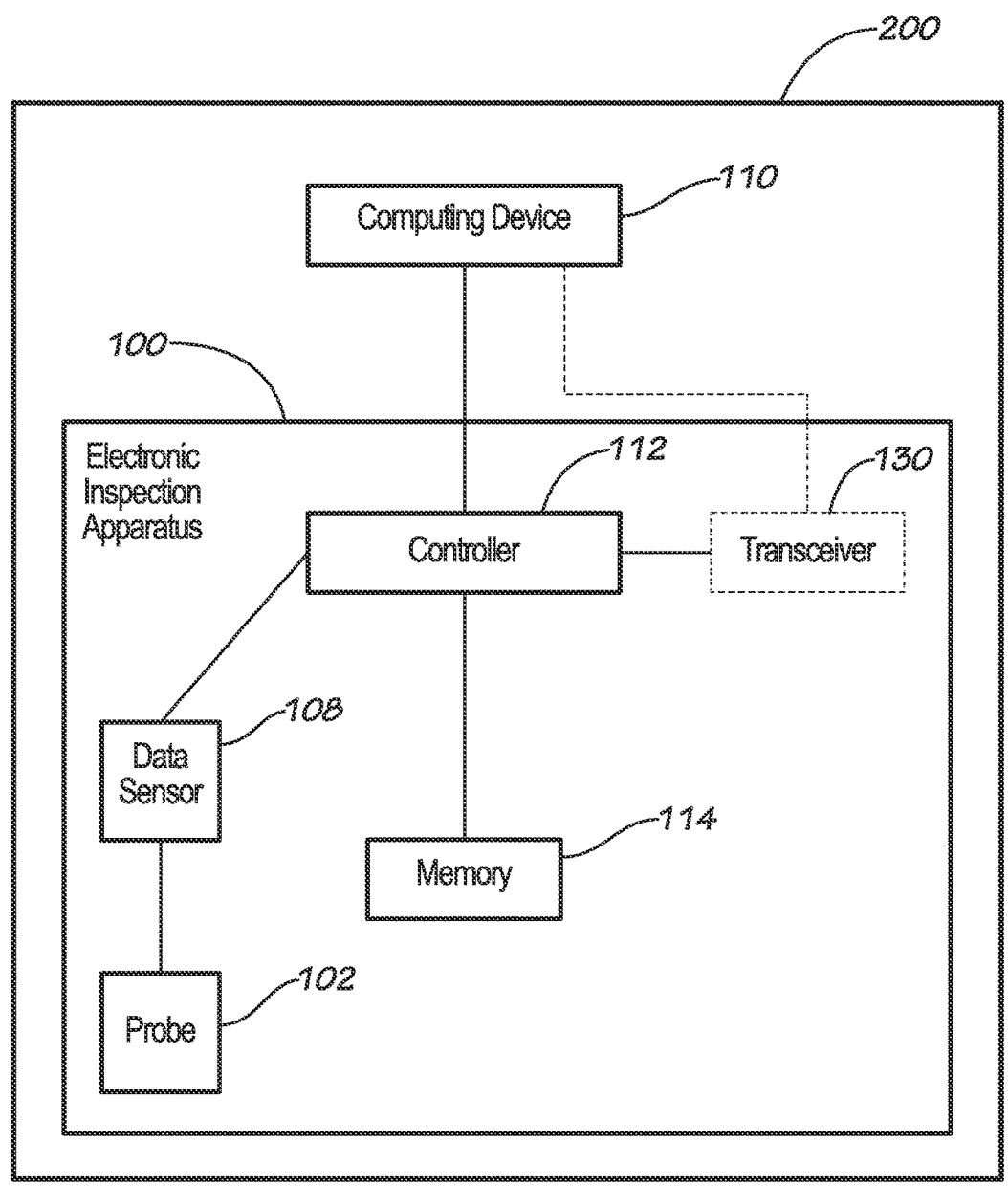
FIG. 2 is a block diagram of an apparatus operable to determine a temperature including a computing device and an electronic inspection apparatus.

Referring to FIGS. 1 and 2, an electronic inspection apparatus 100 includes a portable inspection probe 102, a cable 104, a plug 106, a data sensor 108, a controller 112, and a memory unit 114. The data sensor 108 is functionally coupled to the inspection probe 102. The data sensor 108 senses a condition of an environment proximate probe 102 and provides a data signal indicative of the sensed environmental condition proximate the inspection probe 102. In one embodiment, the cable 104 transfers the data signal from the probe 102 and data sensor 108 to the controller 112 which is housed in the plug 106.

In another embodiment, the controller 112 and memory unit 114 are housed in the probe 102 such that a housing 120 of the probe 102 supports the data sensor 108 (e.g., temperature sensor), inspection probe 102 (e.g., temperature probe), memory unit 114, and controller 112. In this embodiment, the cable 104 is configured to connect the controller 112 to the computing device 110. The cable 104 is effective to conduct power from the computing device 110 to the housing 120 to provide power to the controller 112, which provides power to the sensor 108. The cable 104 provides sensor data (e.g., temperature data) from the controller 112 to the computing device 110. In another embodiment, the housing 120 supports an optional transceiver 130 operably connected to the controller 112. The transceiver 130 receives data from the controller 112 and provides the data to the computing device 110 via a wireless connection between the transceiver 130 and the computing device 110. In one embodiment, the transceiver 130 communicates with the computing device 110 via low power wireless communications links such as Bluetooth or Wi-Fi.

The memory unit 114 is operable to receive and store data. The controller 112 is operable to receive the provided data signal from the data sensor 108, provide data to the memory unit 114 is a function of the received data signal, retrieved the provided data from the memory unit 114, and provide the retrieved data to the computing device 110.

In one embodiment, the computing device 110 includes computer readable storage media having computer executable instructions effective to receive the data from the controller 112 and determine a parameter representative of the sensed condition of the environment proximate the inspection probe 102 as a function of the received data. In some embodiments, the computing device 110 is a mobile device such as a wireless telephone, personal digital assistant, a tablet computer, or other portable device. In one embodiment, the computing device 110 forwards the received data on to a server for storage in an inspection database.

In one embodiment, an apparatus 100 is configured to determine an environmental condition. The probe 102 includes a sensing spike configured to contact food such as by being inserted into the food. In this embodiment, the environmental condition is a temperature of a food, and the probe 102 is configured to contact the food (e.g., by insertion). The data received at the computing device 110 is temperature data, and the computing device 110 determines the temperature of the food as a function of the received temperature data. The electronic inspection apparatus 100 is an electronic temperature probe. The data sensor 108 is a temperature sensor in contact with the probe 102 such that the data signal received at the controller 112 is a temperature signal indicative of a sensed food temperature, and the data received and stored at the memory unit 114 is food temperature data.

In one embodiment, the food temperature data includes samples of the food temperature signal taken at a sample rate. The controller 112 is operable to provide the retrieved temperature data to the computing device 110 at a data rate. In this embodiment, the sample rate is greater than the data rate. Thus, the controller 112 stores temperature data in the memory unit 114 during a logging period which is shorter than a transmit period of the computing device 110 during which the data is transferred to the computing device 110. The logging period is the time required to generate a given number of data samples, and the transmit period is the time required to transfer the given number of data samples to the computing device 110 from the electronic inspection apparatus 100. The controller 112 provides temperature data from the memory unit 114 as allowed by the transfer rate of the computing device 110 during the transmit period. The memory unit 114 thus defines a queue that enables faster data logging than would be possible via the bandwidth and resultant transmit period of the computing device 110. As used herein, a longer period in the context of data transmission refers to a given bandwidth, bit rate, or throughput being less than another bandwidth, bit rate, or throughput such that a data set to be transmitted must be broken up into a plurality of packets for transmission during different data transfer cycles.

In one embodiment, the controller 112 is operable to determine a packet size of the temperature data stored in the memory unit 114. The controller 112 also determines a data packet payload size associated with the computing device 110. The controller 112 then sends the temperature data to the computing device 110 in a plurality of data segments if the packet size of the temperature data exceeds the data packet payload size of the computing device 110.

In one embodiment, the controller 112 provides the food temperature data to the memory unit 114 during a logging period. The controller 112 retrieves the food temperature data from the memory unit 114 by retrieving a portion of the food temperature data on a first-in, first-out (FIFO) basis in response to a transmit period beginning. The controller 112 provides the retrieved food temperature data to the computing device by providing the retrieved portion of the food temperature data to the computing device 110 during the transmit period which is longer than the logging period.

In one method of determining an environmental condition, a data logging period operates independently from a data transmit period. New sensor data is logged and placed in a data transmit queue (i.e., the memory unit 114). When the transmit period begins, the data from the memory unit 114 is acquired and compared to the maximum data block or packet size that can be handled in one transmission cycle by the computing device 110 to which the data block or packet is to be sent. If the amount of queued data exceeds the maximum allowed in one transmission cycle, then the data is separated into data chunks (i.e., blocks, groups, or packets) which are then sent separately (i.e., sent in different transmit cycles) over the data transmit period.

It is contemplated that the sensed environmental condition may be any of a temperature, humidity, or light wavelength and lumen level. It is also contemplated that the probe may determine an environmental condition inside or adjacent food, or an environmental condition independent of any food.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory unit, flash memory unit, ROM memory unit, EPROM memory unit, EEPROM memory unit, registers, hard disk, a removable disk, a DVD, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory unit. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful DEVICE AND METHOD FOR LOGGING DATA FROM AN INSPECTION PROBE TO A COMPUTING DEVICE it is not intended that such references be construed as limitations upon the scope of this invention except as set forth in the following claims.

What is claimed is:

1. An apparatus operable to determine an environmental condition, said apparatus comprising:
   a computing device comprising a computer readable storage media having computer executable instructions effective to receive data and determine the environmental condition as a function of the received data; and
   an electronic inspection apparatus comprising an inspection probe,
   a data sensor functionally coupled to the probe, said data sensor operable to sense a condition of an environment detected by the probe and provide a data signal indicative of the sensed environmental condition detected by the inspection probe,
   a memory unit operable to receive and store data;
   a controller operable to
   receive the provided data signal from the data sensor, provide data to the memory unit as a function of the received data signal, retrieve the provided data from the memory unit, and provide the retrieved data to the computing device;

wherein the environmental condition is a temperature of a food;

the probe is configured to contact the food;

the data received at the computing device is temperature data;

the computing device determines the temperature of the food as a function of the received temperature data;

the electronic inspection apparatus is an electronic temperature probe;

the data sensor is a temperature sensor in contact with the probe;

the data signal is a temperature signal indicative of a sensed food temperature;

the data received and stored at the memory unit is food temperature data;

the data signal received at the controller is the provided food temperature signal from the temperature sensor;

the data provided to the memory unit by the controller is food temperature data;

the data retrieved from the memory unit is the provided food temperature data;

the data provided to the computing device by the controller is the retrieved food temperature data;

the food temperature data comprises samples of the food temperature signal taken at a sample rate;

the controller is operable to provide the retrieved temperature data to the computing device at a data rate;

the sample rate is greater than the data rate; and wherein the controller is further operable to determine a packet size of the temperature data stored in the memory unit;

determine a data packet payload size associated with the computing device; and send the temperature data to the computing device in a plurality of data segments if the packet size of the temperature data exceeds the data packet payload size.

2. The apparatus of claim 1, wherein:

the probe is a spike configured to insert within the food; and the food temperature sensor is positioned in the spike.

3. The apparatus of claim 1, wherein the inspection probe further comprises:

a housing supporting the temperature sensor, temperature probe, memory unit, and controller; and a cable configured to connect the controller to the computing device;

wherein: the cable is effective to conduct power from the computing device to the housing; and the cable is operable to provide the temperature data from the controller to the computing device.

4. The apparatus of claim 1, further comprising:

a housing supporting the temperature sensor, temperature probe, memory unit, and controller; and a transceiver connected to the controller and supported by the housing, wherein the transceiver is operable to receive the temperature data from the controller and provide the temperature data to the computing device via a wireless connection between the transceiver and the computing device.

5. The apparatus of claim 1, wherein the computing device comprises one of a wireless telephone or a tablet computer.

6. An apparatus operable to determine an environmental condition, said apparatus comprising:

a computing device comprising a computer readable storage media having computer executable instructions effective to receive data and determine the environmental condition as a function of the received data;

an electronic inspection apparatus comprising an inspection probe, a data sensor functionally coupled to the probe, said data sensor operable to sense a condition of an environment detected by the probe and provide a data signal indicative of the sensed environmental condition detected by the inspection probe, a memory unit operable to receive and store data; and a controller operable to receive the provided data signal from the data sensor, provide data to the memory unit as a function of the received data signal, retrieve the provided data from the memory unit, and provide the retrieved data to the computing device;

wherein the environmental condition is a temperature of a food;

the probe is configured to contact the food;

the data received at the computing device is temperature data;

the computing device determines the temperature of the food as a function of the received temperature data;

the electronic inspection apparatus is an electronic temperature probe;

the data sensor is a temperature sensor in contact with the probe;

the data signal is a temperature signal indicative of a sensed food temperature;

the data received and stored at the memory unit is food temperature data;

the data signal received at the controller is the provided food temperature signal from the temperature sensor;

the data provided to the memory unit by the controller is food temperature data;

the data retrieved from the memory unit is the provided food temperature data;

the data provided to the computing device by the controller is the retrieved food temperature data;

the food temperature data comprises samples of the food temperature signal taken at a sample rate;

the controller is operable to provide the retrieved temperature data to the computing device at a data rate;

the sample rate is greater than the data rate; and wherein the controller is further effective to:

provide the food temperature data to the memory unit during a logging period;

retrieve the food temperature data from the memory unit comprises by retrieving a portion of the food temperature data from the memory unit on a first in, first out basis in response to a transmit period beginning; and provide the retrieved food temperature data to the computing device by providing the retrieved portion of the food temperature data to the computing device during the transmit period, wherein the transmit period is no longer than the logging period.

* * * * *